United States Patent [19]
Greveling et al.

[11] Patent Number: 5,157,752
[45] Date of Patent: Oct. 20, 1992

[54] OPTICAL FIBER CABLE WITH INTERMINGLED WATER BLOCKING MEANS AND METHOD OF MAKING SAME

[75] Inventors: Johannes I. Greveling; Joyce J. Fidler; David W. Chiasson; Michael G. Rawlyk; Michael S. Fedoroff, all of Saskatoon, Canada

[73] Assignee: Northern Telecom Limited, Montreal, Canada

[21] Appl. No.: 782,198

[22] Filed: Oct. 24, 1991

[51] Int. Cl.⁵ .......................... G02B 6/44; D02G 3/36
[52] U.S. Cl. .................................. 385/112; 385/109; 385/111; 385/113; 57/5; 57/14
[58] Field of Search ............... 385/107, 109, 111, 113, 385/112; 57/1 R, 5, 6, 14; 523/173

[56] References Cited

U.S. PATENT DOCUMENTS

| | | | |
|---|---|---|---|
| 4,312,565 | 1/1982 | Oestreich et al. | 385/107 |
| 4,709,983 | 12/1987 | Plessner et al. | 385/113 |
| 4,763,982 | 8/1988 | Greveling | 385/109 |
| 4,796,970 | 1/1989 | Reeve et al. | 385/109 |
| 4,815,813 | 3/1989 | Arroyo et al. | 385/113 |
| 4,875,757 | 10/1989 | Greveling | 385/113 |
| 4,902,097 | 2/1990 | Worthington et al. | 385/107 |
| 4,909,592 | 3/1990 | Arroyo et al. | 385/113 |
| 4,913,517 | 4/1990 | Arroyo et al. | 385/107 |
| 5,101,467 | 3/1992 | Bernard | 385/113 |

FOREIGN PATENT DOCUMENTS 2169098  7/1986  United Kingdom ........... 385/112 X

*Primary Examiner*—Brian Healy
*Attorney, Agent, or Firm*—R. J. Austin

[57] ABSTRACT

Optical cable with optical fibers and a water blocking element extending together along a passageway. The water blocking element swells upon contact with water so as to block the passageway against water migration. The water blocking element may be of filamentary structure, e.g. string or tape which acts as a carrier for water swellable particles, e.g. polyacrylate. The water blocking element may, however, be a filament of the swellable material which is spun with other filaments, e.g. polyester to form a string. The cable may be air pressurizable.

13 Claims, 4 Drawing Sheets

OPTICAL FIBER CABLE WITH INTERMINGLED WATER BLOCKING MEANS AND METHOD OF MAKING SAME

FIELD OF THE INVENTION

This invention relates to optical cable.

BACKGROUND OF THE INVENTION

Since the commercialization of optical cable, various cable designs have become known. In these designs, two relatively distinct techniques have been suggested or used to prevent or restrict migration of moisture along cable passageways. In one of these techniques, water repellant materials are included in the cable structures. These water repellant materials normally include hydrophobic greases or gels which are caused to fill cable passageways containing the fibers. There are problems associated with the use of greases or gels. For instance, such materials are difficult and costly to apply into and fill cable passageways, the filling operation necessarily taking place as parts of the cable which define the passageways are being formed. In more practical terms, tubes are made for enclosing the fibers, the tubes being extruded around the fibers as the fibers are guided through an extruder head together with the grease or gel which is applied into the tube under pressure. Grease or gel also makes it difficult and unpleasant to handle the fibers during installation or repair of a cable, and at low temperatures (e.g. below 0° C.) change in viscosity of the grease or gel surrounding and contacting fibers may increase signal attenuation in the fibers. A further problem is that because greases or gels may be incompatible with economically desirable plastics which could normally be extruded as tubes for containing the fibers, more expensively engineered polymers may be required for the tubes.

In the other technique for preventing or restricting migration of moisture along the cable passageways, it has been suggested that the passageways should purposely remain unobstructed and pressurized gas (i.e. air) is pumped into the passageways to maintain a moisture-free environment. Such a structure has been described in U.K. Patent Application 2169098A in which pressurized air is caused to flow along grooves formed in a central plastics member of the cable so that the pressurized air can reach into spaces between tubes which surround the plastics member, each of the tubes containing optical fibers. With such an arrangement air flow detectors would be provided to sense a change in air flow rate, upon an escape of air through a damaged region in the outer elements of the cable, so as to trigger an alarm thereby signalling a need for cable repair.

While this latter technique thus provides a means for detecting cable damage, it does not provide a method for containing or preventing worsening of the damage. Hence, before repair can commence after the alarm signal, water may have entered the cable and have flowed freely in both directions from the originally damaged region. This flow does, of course, increase the length of damage along the cable and necessarily increases the cost of repair since the section of cable containing water will need to be replaced.

SUMMARY OF THE INVENTION

The present invention seeks to provide an optical cable which in use will lessen or avoid the above problems.

Accordingly, the present invention provides an optical cable defining an axially extending passageway and an optical fiber means and a water blocking means disposed within and extending along the passageway, the water blocking means comprising an elongate element which swells upon contact with water to block the passageway against the flow of water.

Any element which will provide the required water blocking function will suffice. In one arrangement, the elongate element comprises a particulate water swellable material such as polyacrylate and an elongate carrier for the particular material. The carrier may be of filamentary structure, e.g. a string, or a tape which may be of open construction (e.g. woven) so as to allow for flow of water through the tape for access of the water to the water swellable particles. Alternatively, no particulate material is used and the elongate member comprises a polyacrylate filament or filaments spun with other filaments, e.g. polyester, nylon or aramid filaments to form a string.

In one preferred arrangement the optical fiber means comprises a plurality of optical fibers and a plurality of water blocking elements extend with the fibers along the passageway. These water blocking elements and optical fibers may be randomly positioned in the passageway. In a practical arrangement, a bundle is provided, the bundle comprising a plurality of optical fibers grouped together and a water blocking element is intermingled with and is wrapped around the optical fibers to retain the fibers together.

In the above structures according to the invention, a tube conveniently defines the passageway within it the passageway containing the optical fiber means and the water blocking means.

In a further practical arrangement, the cable comprises a tube having an inner surface defining the passageway and the water blocking means comprises a water swellable blocking material disposed around the inner surface of the tube, the optical fiber means being disposed radially inwardly of the blocking material. In this arrangement the passageway is not completely occupied by the optical fibers so as to provide spaces to allow for freedom for gas flow along the passageway.

The invention also includes an elongate optical fiber bundle comprising a plurality of optical fibers and at least one elongate swellable water blocking element which extends along the bundle.

The invention further includes a method of making an optical cable comprising forming a tube to define a passageway within the tube and, as the tube is being formed, feeding an optical fiber means and at least one elongate water swellable blocking element into the passageway.

BRIEF DESCRIPTION OF THE DRAWINGS

Embodiments of the invention will now be described, by way of example, with reference to the accompanying drawings, in which.

DETAILED DESCRIPTION

Figure 1:
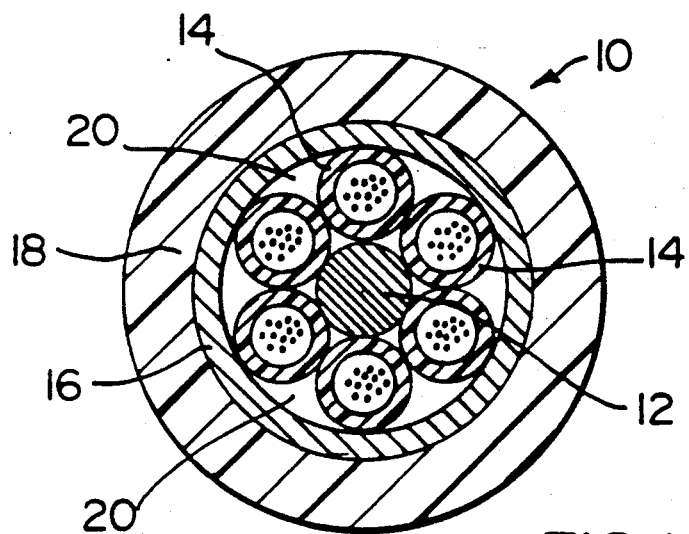
FIG. 1 is a cross-sectional view through an optical cable according to a first embodiment and to an enlarged scale.

In a first embodiment of the invention as shown in FIG. 1, an optical cable 10 comprises a central axially extending tensile strength member 12 which may be formed from any suitable material to resist undue elongate of the cable. Such suitable material includes steel or fiberglass strands or tensile filaments embedded in a suitable resin material. Surrounding the strength member 12 are a plurality of elastomeric tubes 14 which substantially contact each other around the central strength member and extend longitudinally of the cable helically around the $ strength member. Surrounding the tubes 14 is a corrugated steel sheath 16 and outwardly from this is disposed a cable jacket 18 of suitable polymeric material, e.g. a polyethylene compound. Within the jacket and between the tubes 14 and around the central strength member 12 there are o defined spaces 20 which are filled with a grease or gel water blocking material provided to prevent migration of water along the cable. Alternatively, the water blocking material is provided by a material which swells upon contact with water so as to block the spaces between the tubes against the flow of water. Such material may be provided by particles of polyacrylate which are loosely inserted into the gaps between the tubes or alternatively polyacrylate particles may be borne upon an elongate carrier, or polyacrylate filaments spun along with a polyester, nylon or aramid filament to form a string.. With the alternative structure which avoids greases or gels in contact with the tubes 14, the tubes may be formed from a relatively inexpensive material which is not necessarily compatible with greases or gels. Such inexpensive materials includes compounds of polyethylene.

Figure 2:
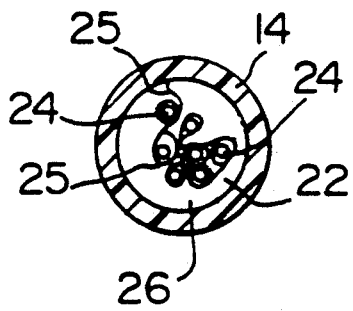
FIG. 2 is a cross-sectional view through part of the cable of the first embodiment and to a larger scale than in FIG. 1.
Figure 3:
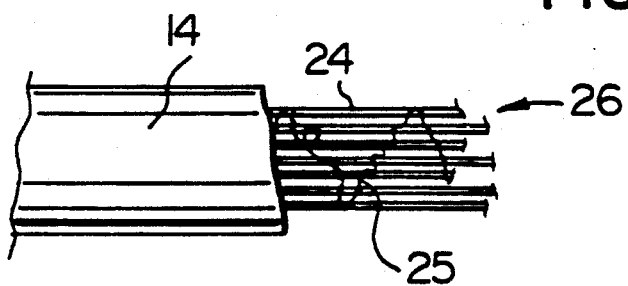
FIG. 3 is a side elevational view, to the scale of FIG. 2, of the part of the cable of the first embodiment.

As shown by FIG. 2, each of the tubes 14 defines a passageway 22 which extends along the cable, the passageway containing an optical fiber means and a water blocking means. The optical fiber means comprises a plurality of optical fibers 24 and as shown by FIG. 3, the water blocking means comprises an elongate element 25 which swells upon contact with water to block the passageway 22 against the flow of water. This elongate element comprises a filamentary structure, e.g. a string which is formed from polyacrylate filaments together with polyester, nylon or aramid filaments to form a string. The elongate element 25 is intermingled with the plurality of optical fibers as shown in FIG. 3 so as to hold the optical fibers in a bundle 26. As shown, this is effected by the elongate element 25 extending along the bundle while passing from fiber to fiber and around each fiber in turn to hold the fibers together. As described, each tube 14 has a passageway of a specific diameter. In the embodiment only one elongate element 25 is provided with each bundle 26 of optical fibers for insertion into a tube and the amount of polyacrylate filaments in the element 25 are sufficient to block the passageway 22 at any position at which water may enter the passageway so as to prevent flow of water along the passageway. Undoubtedly if the diameter of the passageway should be greater then two or more of the elongate elements 25 should be included with the fibers as required. Additional elongate elements 25 may be used intermingled with the optical fibers as shown by FIG. 3. Further, the bundle 26 of fibers 24 together with the elongate elements 25 may have complete freedom for lateral movement within the corresponding tube 14 so that the tube remains essentially unblocked so as to allow for flow of air through the tube to provide an air pressurized cable. Alternatively the bundle of fibers 24 and the elongate element 25 provide such a finished diameter as to substantially fill the tube 14 whereby air pressurization may become more difficult.

Figure 4:
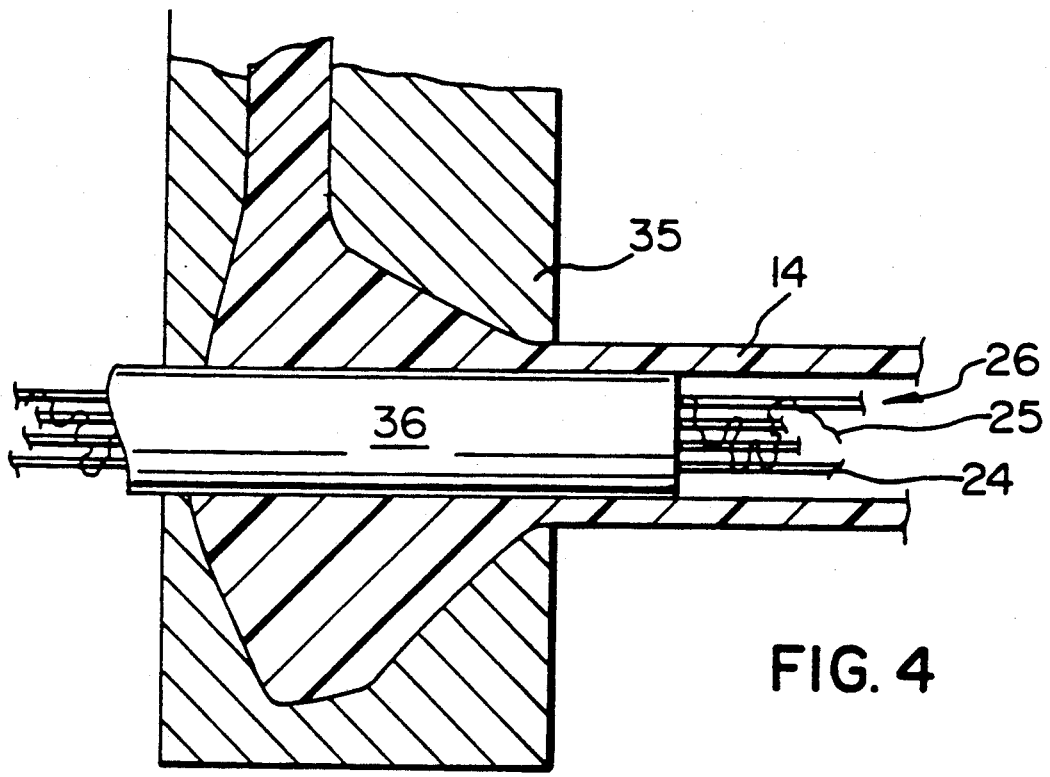
FIG. 4 is a side elevational view in crosssection of apparatus for completing the structure shown in FIG. 2.

As part of the cable processing steps as shown by FIG. 4, a bundle 26 of the optical fibers is passed through a core or guide tube 36 and out through an extrusion orifice of an extruder head 35 while a tube 14 is extruded around the group. Subsequently, the plurality of tubes 14 containing their fibers are wrapped around the central strength member in alternating helical fashion as discussed above before the corrugated steel sheath 16 and the jacket 18 is formed to complete the cable.

In use, should the cable become damaged and water enter into any of the tubes 14, then upon contact of the water upon the immediate swelling of the polyacrylate results in blockage of the particular tube against the flow of water so that the water remains in the immediate vicinity of the damaged region of the tube. Thus, as the extent of damage to the tube is contained then the cost of any repair to the cable is minimized and also is simplified. In addition, during repair the fibers 24 in any particular tube 14 are not immediately surrounded by grease or gel so the unpleasantness and difficulty in handling fibers in the presence of the these two water blocking materials is avoided. This particular problem is also avoided, of course, during installation of the cable. In addition to this, all the difficulties and cost of applying greases or gels into the passageways of a tube during cable manufacture are also avoided while the use of the polyacrylate water blocking material by its inclusion into the passageways as part Of an elongate element is a particularly convenient and environmentally clean method of ensuring that water blocking cable structures are provided. Further to this as greases or gels are not being used in the cable construction of the first embodiment, then complex and expensively engineered polymers are not required for the tubes to make them compatible with greases or gels. Instead, as in this present embodiment, the tubes 14 may be formed from conventional and economically feasible extrudable polymer materials, e.g. polyethylene compounds.

Figure 5:
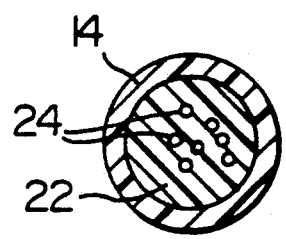
FIG. 5 is a view similar to FIG. 2 showing the condition of the structure of FIG. 2 after contact by water.

As shown in FIG. 5, should there be ingress of water into any of the tubes 14 at a damaged region, then the water will immediately expand the polyacrylate so as to block the damaged passageway 22 to form a swelled water blocking barrier 40 as shown in FIG. 5.

The advantages in the use of the construction of the first embodiment as discussed above all apply to the further embodiments now to be described.

Figure 6:
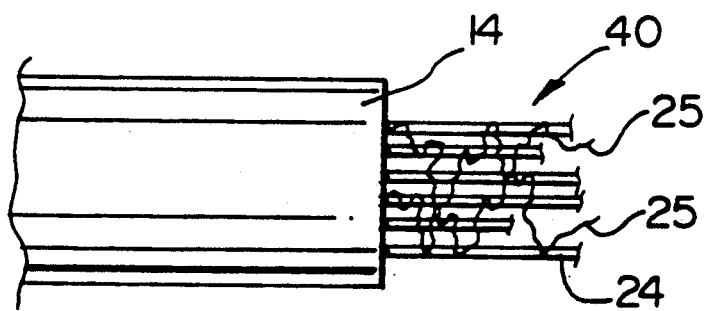
FIG. 6 is a view similar to FIG. 3 of a modification to the first embodiment.

In a modification of the first embodiment as shown by FIG. 6, each of the tubes 14 is of larger diameter such that more polyacrylate is required for blocking purposes for each unit length of tube. For this purpose in the modification, each bundle 40 of fibers 24 includes two or more elongate elements 25 extending longitudinally and intermingled with the optical fibers.

In alternative modifications, not shown, the elongate elements 25 extend along each tube 14 while not being present in a fiber bundle.

Figure 7:
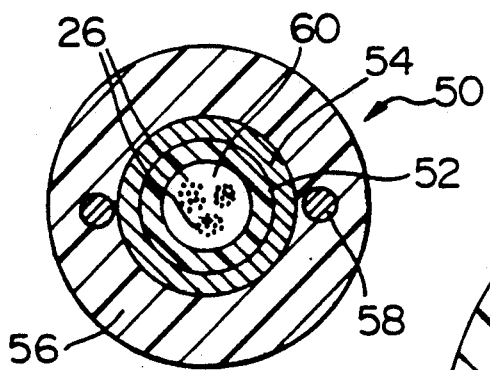
FIG. 7 to an enlarged scale, is a view similar to FIG. 1 of a second embodiment of the invention.

In a second embodiment as shown in FIG. 7 an optical cable 50 comprises a central tube 52 formed from a lo suitable polymeric material. e.g. a polyethylene compound, the tube surrounded by a steel corrugated sheath 54 and a polymeric jacket 56 also of suitable polymeric material, e.g. polyethylene. Within the jacket 56 and diametrically opposed across the axis of the cable are two tensile strength members 58 which extend longitudinally of the cable.

The tube 52 surrounds a passageway 60 within which is disposed an optical fiber means and a water blocking means for the passageway. As shown by FIG. 7 the optical fiber means and the water blocking means are constituted by three structures each as described in the first embodiment, i.e. comprising a bundle 26 of optical fibers 24 and at least one elongate element 25 in the form of string. The bundles 26 of optical fibers are inserted into the tube 52 during tube manufacture in a similar manner to that described in the first embodiment and with reference to FIG. 4.

In the event of damage occurring to the cable sufficiently to allow for ingress of water into the passage way 60 then contact of the water with the polyacrylate of the elongate element 25 results in swelling of the polyacrylate to block the passageway 60 in a manner similar to that described in the first embodiment.

Figure 8:
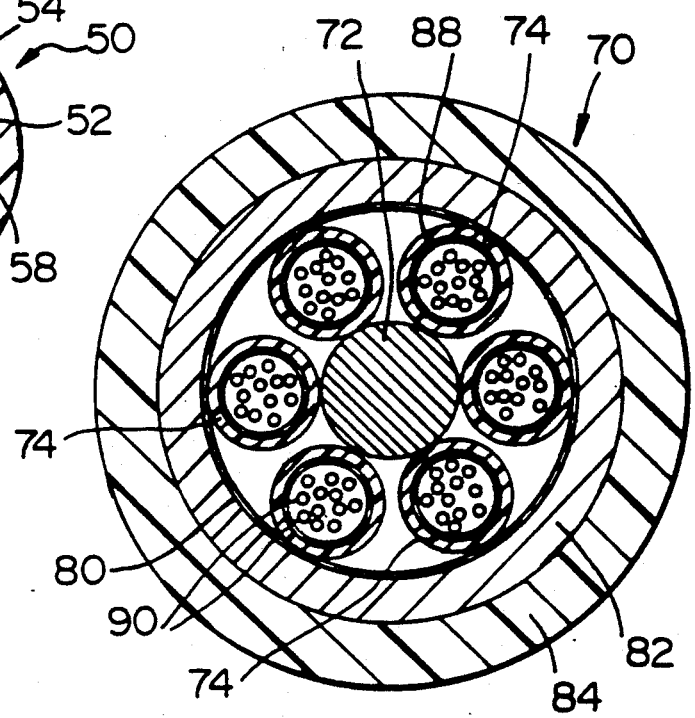
FIG. 8 to an enlarged scale, is a view similar to FIG. 1 of a third embodiment of the invention.

In a third embodiment as shown by FIG. 8, a cable 70 has a central strength member 72 and tubes 74 surrounding the central strength member in a manner similar to that described in the first embodiment. The difference between this embodiment and the first embodiment is concerned with the structure within passageways 86 defined within each of the tubes 74. Instead of the passageways 86 containing bundles of fiber held together by elongate elements 25 which are water swellable as described in the first embodiment, in each of the tubes 74 of the third embodiment a water blocking means is attached to the inner surface of each tube. This water blocking means comprises a tape 88 of open structure, possibly formed by laminated paper, and the tape forms a carrier for particulate water swellable material, i.e. polyacrylate particles, which cover the tape. Optical fibers 90 within each of the tubes 74 thus lie radially inwardly of the tape 88. The optical fibers 90 may be either completely free relative to one another for lateral movement within the tube or, preferably, the optical fibers are contained in a bundle by a helical binder (not shown) of conventional binder material and which extends along each bundle. In any event, the optical fibers 90 are free to move laterally of their particular passageways so that each passageway remains open from end-to-end for the flow of air through the passageway. In FIG. 8, the tubes 74 are shown spaced apart to show clearly the structure of each tube 74 and tape 88. In practice, the tubes 74 contact each other.

Figure 9:
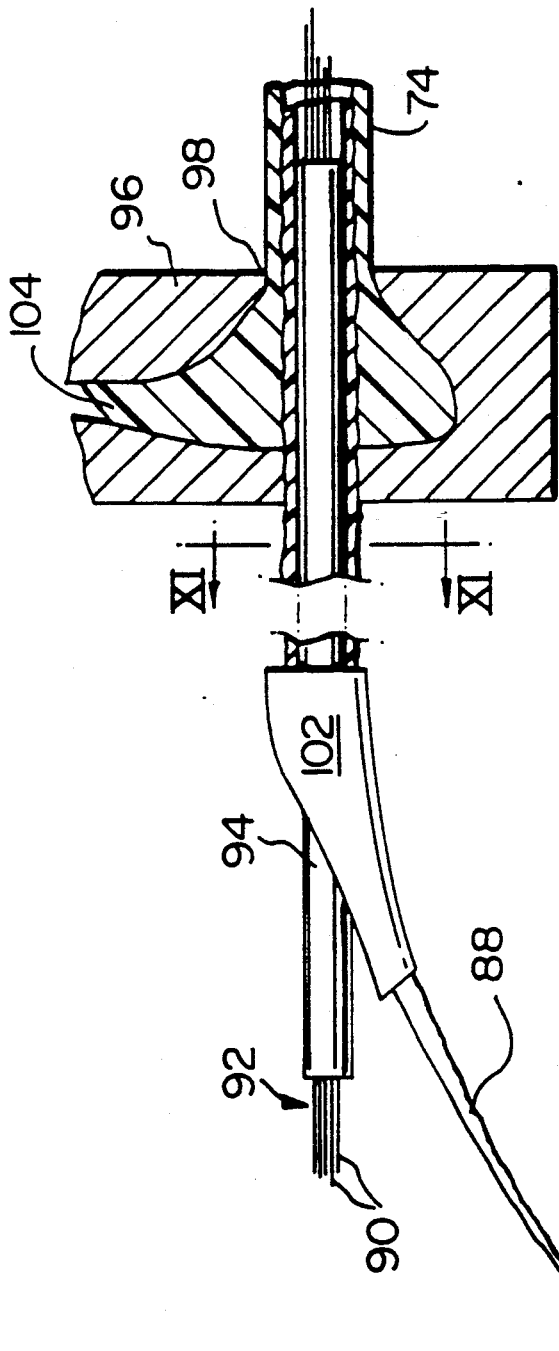
FIG. 9 is a partly diagrammatic side elevational view of an apparatus for forming part of the cable of the third embodiment and to a smaller scale than FIG. 8.
Figure 10:
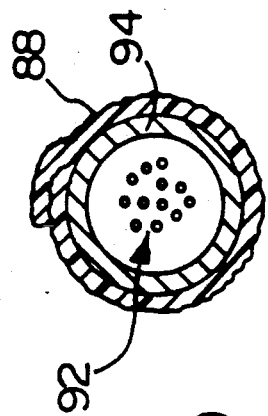
FIG. 10 is a cross-sectional view taken along line X—X in FIG. 9 and to a larger scale than FIG. 9.
Figure 11:
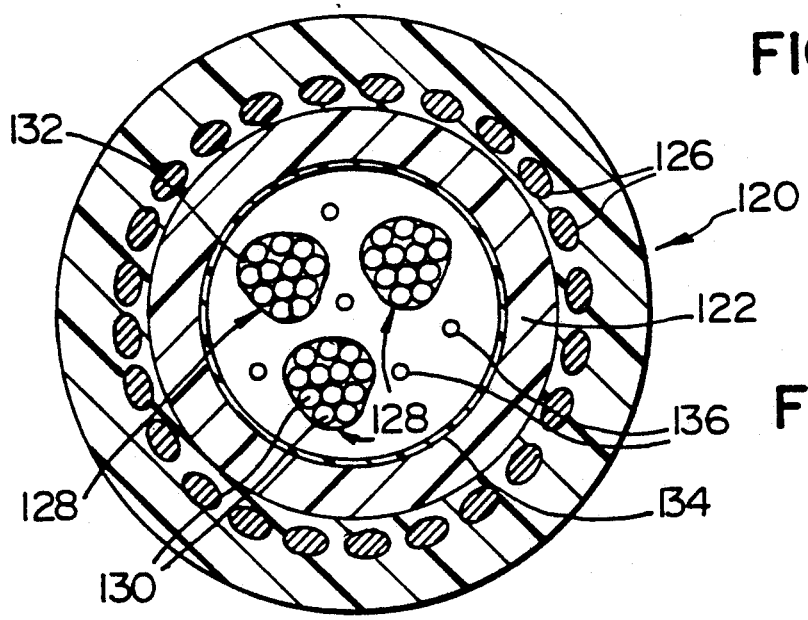
FIG. 11 to an enlarged scale, is a view similar to FIG. 1 of a fourth embodiment.

During the manufacture of the cable 70, as shown by FIG. 9, a bundle 92 of optical fibers 90 is fed through a core tube 94 which projects through an extruder head 96 and passes slightly downstream from the extrusion orifice 98. The water blocking means 88 is stored upon a reel 100 and is fed from the reel through conventional wrapping means 102 which forms the flat tape 88 around the core tube 94 so as to completely enclose it with longitudinally extending end regions of the tape overlapping as shown by FIG. 11. The wrapped tape 88 then proceeds downstream along the core tube 94 as the bundle 92 of optical fibers proceeds through the tube. Towards the downstream end of the core tube 94, extrudate 104 for forming the tube 74, contacts the tape 88 and is extruded through the die orifice 96 so as to form a tube 74 which become mechanically locked into the interstices of the woven tape 88. The core tube supports the tape 88 during extrusion so as to prevent its collapse. The finished tube 74 which now carries the wrapped tape 88 then proceeds downstream from the extrusion orifice to cool before being stored prior to assembly with the other elements to form the cable 70.

In use, the cable 70 effectively provides an air pressurizable cable. Should damage occur to the cable sufficiently for water to enter into any of the tubes 74 then while the change in the flow of air will immediately sound an alarm to indicate damage, the contact of water with the particulate material on the tape 88 will immediately cause swelling of the material to block the appropriate passageway 86 and restrict the flow of water to the immediate region in which the initial damage has occurred. Hence, upon a repair crew locating the site of the damage, then an extremely short region of the cable in the immediate vicinity of the initial damage will have been flooded by water. Accordingly, the repair process proceeds in as simple a manner as possible while ensuring that the length of cable which needs to be replaced is as short as possible.

In a fourth embodiment as shown by FIG. 11, an air pressurizable cable 120 comprises a central tube 122 of polymeric material, e.g. polyethylene, the tube surrounded by a polyethylene jacket 124. Within the jacket are dis: posed a plurality of longitudinally extending tensile strength members 126.

Within the tube 122 are disposed three bundles 128 of optical fibers 130, the optical fibers being held in position by a binder 132 extending helically around the bundle. A water blocking means of similar structure to that of the third embodiment is provided for the tube and this comprises a woven or non-woven tape 134 which forms a carrier for a covering layer of water swellable particles of polyacrylate. This tape 134 is bonded mechanically to the inside of the tube during a tube extrusion process. The assembly of the tube 122 with the tape 134 holding the particles and the bundles 128 of optical fibers is constructed in a manner similar to that described in a third embodiment and with reference to FIG. 9. After manufacture of the tube and fiber assembly the strength members are embedded in the jacket 124 during extrusion of the jacket around the tube 122.

As may be seen from FIG. 11, the passageway within the tube 122 is substantially open, apart from the presence of the bundles 128, to allow for the flow of air to provide the pressurized cable. Should water enter the tube 122 because of damage occurring to the jacket 124 then a water blocking function of the particles on the tape 134 occurs similar to that described in the third embodiment.

Should the tape 124 not carry sufficient particles for the water blocking function, then further water swellable material may be disposed radially inwardly of the tape 134. This additional water blocking material may be provided for instance by particles of polyacrylate adhering to an elongate element in a form of one or more strings 136, as shown in FIG. 11, or by strings similar to the elongate element 25 of the first embodiment included in the bundles 128.

What is claimed is:

1. An optical cable defining an axially extending passageway and comprising a plurality of optical fibers defining spaces between the fibers and a water blocking means disposed within and extending along the passageway, the water blocking means comprising at least one elongate element which extends longitudinally of and is intermingled with the optical fibers and which swells upon contact with water to block the passageway against the flow of water while blocking spaces between the optical fibers.

2. A cable according to claim 1 wherein the elongate element holds the optical fibers together in a bundle.

3. A cable according to claim 2 wherein the elongate water swellable element includes filaments of water swellable material.

4. A cable according to claim 2 including at least one further elongate element which extends along the passageway and disposed laterally of the bundle of optical fibers.

5. A cable according to either claim 1, claim 2 or claim 4 which is an air pressurizable cable, the passageway being open to allow for gas flow along the passageway and around the optical fibers and into contact with the water blocking means.

6. A cable according to claim 1 comprising a tube having an inner surface which defines the passageway and the water blocking means further comprises a water swellable material disposed around the inner surface of the tube, the optical fibers being disposed radially inwardly of the water blocking material around the inner surface of the tube with the passageway allowing for gas flow along the passageway and around the optical fibers.

7. A cable according to claim 6 wherein the water blocking material around the inner surface of the tube comprises a tape carrying a particulate water swellable water blocking substance, the tape supported by the inner surface of the tube.

8. A cable according to either claim 1, claim 4, claim 6 or claim 7 wherein the cable passageway is central of and coaxial with the cable and longitudinally extending tensile strength members are provided radially outwardly of the passageway.

9. A cable according to either claim 1, claim 2, claim 4, claim 6 or claim 7 having a coaxial central tensile strength member and a plurality of tubes are disposed outwardly from the strength member and extend along the strength member, each tube providing a passageway with some at least of the passageways housing a plurality of optical fibers and water blocking means.

10. An elongate optical fiber bundle comprising a plurality of optical fibers defining spaces between the fibers and at least one elongate water swellable water blocking element which extends longitudinally of and is intermingled with the optical fibers of the bundle.

11. A bundle according to claim 10 wherein the elongate water blocking element extends along and around the grouped together fibers to retain the fibers together in the group.

12. A method of making an optical cable comprising:
providing an elongate optical fiber bundle comprising a plurality of optical fibers defining spaces between the fibers and at least one elongate water swellable water blocking element which extends longitudinally of and is intermingled with the optical fibers of the bundle;
forming a tube to define a passageway within the tube; and
as the tube is being formed, feeding the elongate optical fiber bundle into the passageway.

13. A method according to claim 12 comprising wrapping a tape carrying water blocking swellable particles around a mandrel while feeding the elongate optical fiber bundle through the mandrel, passing the tape along the mandrel and through an extrusion orifice while extruding a tube around the tape upon the mandrel to form a tube and tape assembly, and then passing the assembly beyond the extrusion orifice and the mandrel with the tape supported upon the inner surface of the tube.

* * * * *